Feb. 18, 1941.  H. E. POWELL  2,232,471
LIGHT PROJECTOR
Original Filed Jan. 21, 1939
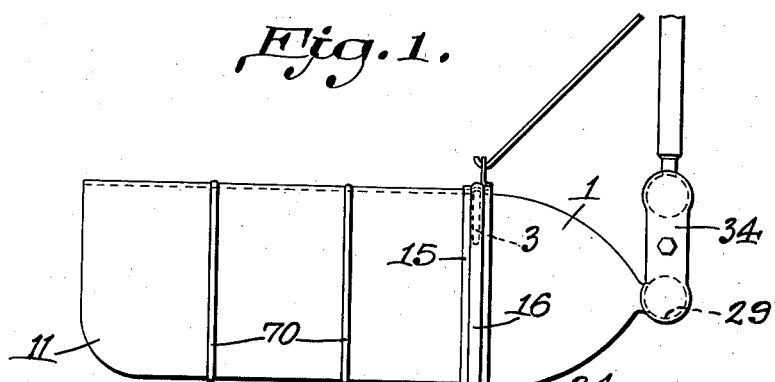
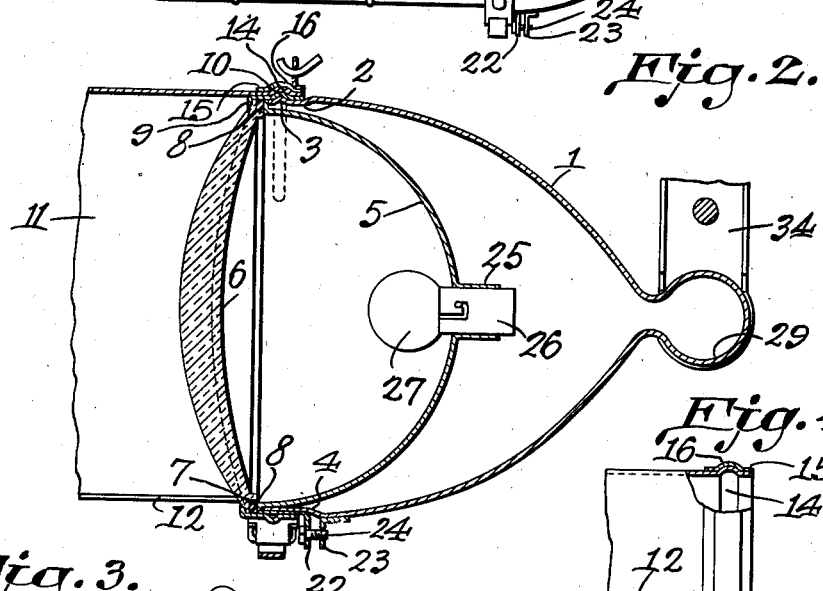
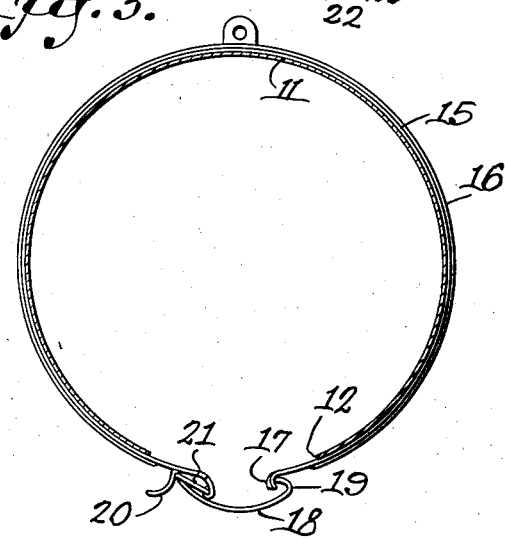
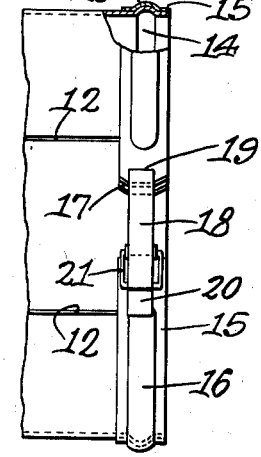
H. E. Powell
INVENTOR.
BY
ATTORNEYS.

Patented Feb. 18, 1941

2,232,471

UNITED STATES PATENT OFFICE 2,232,471

LIGHT PROJECTOR

Harry E. Powell, Logansport, Ind.

Original application January 21, 1939, Serial No. 252,228. Divided and this application August 24, 1939, Serial No. 291,746

1 Claim. (Cl. 240—48.4)

This invention discloses a light projector, divided out of my pending application Serial No. 252,228, filed January 21, 1939.

This invention aims to provide a new and useful lamp for use on automobiles and similar vehicles, the construction being such that the lamp may be located below the bumper of the vehicle, to throw light down on the road without illuminating the fog above an elevation represented by the bumper, to the discomfort of the driver of the car. Another object of the invention is to supply a device of the class described wherein a deflector, associated with the lamp, may be adjusted about a longitudinal axis, to throw light on the roadway at different places, considered transversely of the line of advance of the vehicle. A further object of the invention is to improve the lamp construction.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 is a side elevation;

Fig. 2 is a longitudinal section;

Fig. 3 is a cross section; and

Fig. 4 is a bottom plan, parts being broken away in Figs. 2 and 4.

In carrying out the invention, there is provided a tapered lamp body 1, the body 1 having a spherical boss 29 on its rear end. The forward end of the body 1 is reduced in diameter to fashion a neck 2. The neck 2 is supplied with a hollow outstanding bead 3. The bead 3 extends but part way around the neck 2, as the dotted line showing of Fig. 2 will make manifest. Opposite to the bead 3, the neck 2 is inset to form a seat 4. A reflector 5 is disposed within the body 1. The reflector 5 has a flange overlapping the forward end of the neck 2. The numeral 6 marks a lens. The lens 6 has an annular marginal recess 7. A resilient gasket 8 is mounted in the recess 7. The gasket 8 may be considered as part of the lens 6. The gasket 8 abuts against the flange at the forward end of the reflector 5.

A retaining ring 9 extends around the neck 2 of the lamp body 1 and has a flange overlapping the forward surface of the lens 6. The retaining ring 9 has a hollow circumferential head 10. The bead 3 and the neck 2 on the lamp body 1 are received in the bead 10 of the retaining ring 9. Because the bead 3 of the neck 2 extends but a short distance around the neck, the bead 3 can be received in the bead 10 of the retaining ring 9, and then the part of the retaining ring 9 that is not adjacent to the bead 3 can be pushed back into place, as shown in Fig. 1.

One flange of an angle bracket 22 is secured to the retaining ring 9. The purpose of the seat 4 in the neck 2 of the lamp body 1 is to receive said flange of the angle bracket 22, and set the angle bracket inwardly to such an extent that the retaining ring 9 will not be humped away from the neck 2 of the body. An angle bracket 23 is secured to the body 1. The angle brackets 22 and 23 are connected by a draw screw 24. When the screw 24 is tightened up, the retaining ring 9 will be held in the position shown in Fig. 1.

The numeral 11 marks a cylindrical deflector having transverse reinforcing ribs 70. The deflector 11 is open at its forward end, and is provided with a longitudinal opening 12 extended from one end of the deflector to the other. The rear end of the deflector 11 extends around the retaining ring 9 and has a circumferential, hollow bead 14, receiving the bead 10 of the retaining ring 9.

A gripping band 15 extends around the rear end of the deflector 11. The gripping band 15 has a longitudinal bead 16. The bead 16 of the gripping band 15 receives the bead 14 on the rear end of the deflector 11. At one end, the gripping band 15 has a hook 17. A bowed connector 18 is provided. The connector 18 is supplied at one end with a hook 19. At its opposite end, the connector 18 is equipped with an offset finger piece 20.

A keeper 21, in the form of a link, is pivoted to the intermediate portion of the connector 18, and to the adjacent end of the gripping band 15.

When the hook 17 of the gripping band 15 is engaged with the hook 19 of the connector 18, and when the keeper 21 is swung back against the band 15, as in Fig. 2, the band will be held tightly about the deflector 11, and the deflector, in turn, will be held against rotation on the retaining ring 9. By means of the finger piece 20, the operator can loosen the connector 18, slacking away the resilient gripping band 15 and, then, the deflector 11 can be rotated about its axis, thereby to shift the position of the opening 12 in the deflector, so that the opening will permit light to be thrown downwardly toward the surface of the road, inwardly toward the longitudinal center of the road, or laterally, as occasion may require.

The reflector 5 has a tubular neck 25, in which is mounted a socket 26, carrying an electric lamp 27. The numeral 34 designates, generally, any suitable means engaged with the spherical boss 29, at the rear end of the lamp body 1, to support the lamp body either above or below the bumper of a vehicle, or to carry the lamp body in any other position which the operator may require.

The device forming the subject matter of this application is simple in construction but will be found thoroughly advantageous for the ends in view.

Having thus described the invention, what is claimed is:

In a lamp construction, a body having a bead extended part-way around the body, a lens, a retaining ring having a circumferential bead engaged with the bead of the body, the body being inset in remote relation to the bead, to form a seat, an angle bracket one flange of which is connected to the ring and received in the seat to prevent the ring from rotating, a draw connection between the other flange of the bracket and the body, a tubular deflector having a longitudinal opening extended the full length of the deflector, the deflector being provided with a transverse bead engaged with the bead of the ring and permitting a circumferential adjustment of the deflector whilst the ring is held against rotation by the first-specified flange of the angle bracket, and a tightening band extended about the deflector and provided with a transverse bead receiving the bead of the deflector.

HARRY E. POWELL.